United States Patent [19]

Suzuki et al.

[11] Patent Number: 4,964,030

[45] Date of Patent: Oct. 16, 1990

[54] APPARATUS FOR TRANSLATING SENTENCES CONTAINING PUNCTUATION MARKS

[75] Inventors: Hitoshi Suzuki; Shinobu Shiotani; Shinji Tokunaga, all of Nara; Tokuyuki Hirai, Yamatokoriyama; Yoji Fukumochi, Nara; Shuzo Kugimiya, Nara; Ichiko Sata, Nara, all of Japan

[73] Assignee: Sharp Kabushiki Kaisha, Osaka, Japan

[21] Appl. No.: 126,262

[22] Filed: Nov. 27, 1987

[30] Foreign Application Priority Data

Nov. 28, 1986 [JP] Japan .................................. 61-284484
Nov. 28, 1986 [JP] Japan .................................. 61-284485
Nov. 28, 1986 [JP] Japan .................................. 61-284491

[51] Int. Cl.$^5$ ............................................. G06F 15/38
[52] U.S. Cl. ..................................................... 364/419
[58] Field of Search ................ 364/419, 900 MS File, 364/200 MS File

[56] References Cited

U.S. PATENT DOCUMENTS 4,593,356  6/1986  Hashimoto et al. ................. 364/419
4,706,212 11/1987  Toma .................................... 364/419
4,773,009  9/1988  Kucera et al. ....................... 364/419
4,821,230  4/1989  Kumano et al. ..................... 364/419

FOREIGN PATENT DOCUMENTS 0230339  7/1987  European Pat. Off. .

OTHER PUBLICATIONS

Abe, *Patent Abstracts of Japan*, vol. 10, No. 57, Group No. P434, Abstract No. 60-201467, 10/1985.
Kumano et al., *Patent Abstracts of Japan*, vol. 12, No. 2, Group No. P652, Abstract No. 62-163173, 7/1987.

*Primary Examiner*—Jerry Smith
*Assistant Examiner*—David Huntley

[57] ABSTRACT

A translation system for translating a sentence of an original language into a sentence of a target language utilizes a computer which pre-treats insertion marks. These insertion marks can be quotation marks, colons, semicolons or parentheses found in the original language sentence. The computer also post-treats the insertion marks to provide an appropriate translation of the insertion marks into the target language sentence. These translations of the insertion marks are carried out without carrying the insertion marks throughout the whole translation process.

10 Claims, 15 Drawing Sheets

B1

| t | h | i | s |  |  |  |  |
|---|---|---|---|---|---|---|---|
| i | s |  |  |  |  |  |  |
| a |  |  |  |  |  |  |  |
| p | e | n |  |  |  |  |  |
|   |   |   |   |   |   |   |   |

B2

| this --- | PRONOUN | DEMONSTRATIVE ADJECTIVE |
|---|---|---|
| is --- | VERB | |
| a --- | ARTICLE | |
| pen --- | NOUN | |

Fig. 8a

| This | PRONOUN | DEMONSTRATIVE ADJECTIVE | |
|---|---|---|---|
| chapter | NOUN | | |
| explains | VERB | | |
| ; | PUNCTUATION | PRONOUN | (CONJUNCTION) |
| . | PUNCTUATION | | |

Fig. 8b

| This | PRONOUN | DEMONSTRATIVE ADJECTIVE | |
|---|---|---|---|
| chapter | NOUN | | |
| explains | VERB | | |
| these | PRONOUN | DEMONSTRATIVE ADJECTIVE | |
| ; | PUNCTUATION | PRONOUN | (CONJUNCTION) |
| . | PUNCTUATION | | |

Fig. 8c

| This | PRONOUN | DEMONSTRATIVE ADJECTIVE | |
|---|---|---|---|
| chapter | NOUN | | |
| explains | VERB | | |
| these | PRONOUN | DEMONSTRATIVE ADJECTIVE | |
| ; | (PUNCTUATION) | (PRONOUN) | CONJUNCTION |
| the | DEMONSTRATIVE ADJECTIVE | | |
| next | ADJECTIVE | | |
| chapter | NOUN | | |
| explains | VERB | | |
| those | PRONOUN | DEMONSTRATIVE ADJECTIVE | |
| . | PUNCTUATION | | |

| «ENGLISH» | «JAPANESE» |
|---|---|
| 1 This chapter explains ; | この章は、以下を説明する。 |
| 2 This chapter explains these ; | この章は、これらを説明する。 |
| 3 This chapter explains these; the next chapter explains those. | この章は、これらを説明する；次の章は、それらを説明する。 |

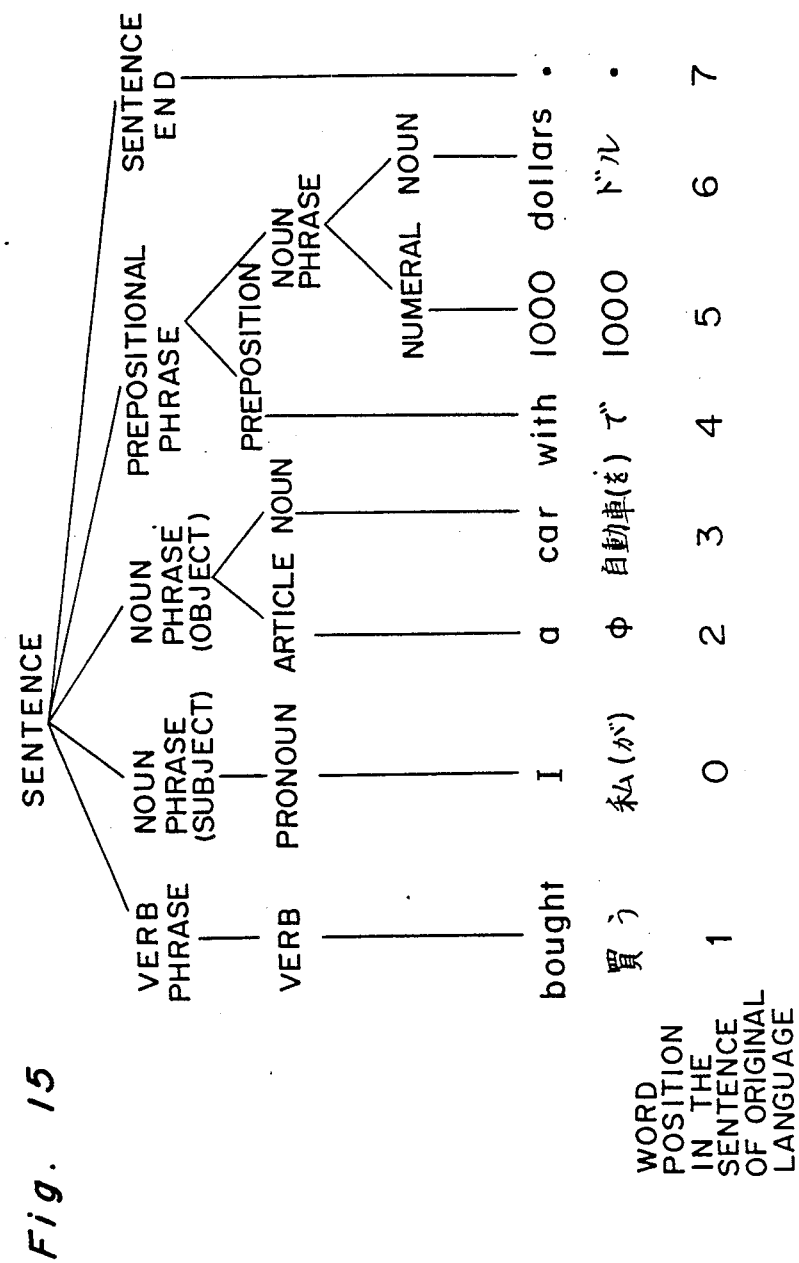

Fig. 16

| I bought a car "with 1000 dollars." | 私は、「1000ドルで」自動車を買った。 |

Fig. 17

| I bought "a car with 4 doors." | 私は、「4ドアのある自動車」を買った。 |

Fig. 18

| He said to me, "I bought a car with 1000 dollars." | 彼は、私に「私は、1000ドルで自動車を買った」と言った。 |

Fig. 20

| | PARTS OF SPEECH | | NUMBER OF WORDS |
|---|---|---|---|
| I | PRONOUN | | 1 |
| have | AUXILIARY VERB | VERB | 1 |
| a | ARTICLE | | 1 |
| pen | NOUN | | 7 |
| ( | NOUN | | 6 |
| I | PRONOUN | | 1 |
| bought | VERB | | 1 |
| it | PRONOUN | | 1 |
| yesterday | ADVERB | | 1 |
| ) | NOUN | | 1 |

APPARATUS FOR TRANSLATING SENTENCES CONTAINING PUNCTUATION MARKS

BACKGROUND OF THE INVENTION

1. Field of the Invention

The present invention relates to a language translation system which performs translation from one language (original language) to another language (target language) using a computer. More particularly, the present invention relates to a language translation system which can automatically translate a sentence even when it contains one or more colons, semicolons, quotation marks, or parentheses, etc. which are herein generally called inserted marks.

2. Description of the Prior Art

A general idea how the computer translation is carried out from one language to another language will be explained. As shown in FIG. 1, a sentence of the original or source language is processed so that a word-to-word dictionary look-up is obtained, and then the source language is analyzed in the various steps, which are: morphological analysis; syntactic analysis; semantic analysis; and context analysis, to obtain an intermediate language which does not belong to any existing language, but can be understood only by the computer. The steps carried out in each analysis will be further understood from Table 1 shown below.

TABLE 1

| Analysis Steps | Analysis |
| --- | --- |
| Dictionary look-up and morphological analysis | Find a word in a dictionary and provide its translation as well as other word information, such as verb, noun, adverb, adjective, plural, singular, tense, person, etc, according to the stored grammar text. |
| Syntactic analysis | Find a relationship between the words, clauses and/or phrases to determine one or more possible sentence constructions, each analyzed in a form of a tree structure. |
| Semantic analysis | Select one sentence construction which is most appropriate from the viewpoint of the meaning. |
| Context analysis | Understanding the theme of the sentence and to clarify the vague expressions. |

After the intermediate language is obtained, the computer forms and generates a sentence in the target language through the steps of: context generation; semantic generation; syntactic generation; and morphological generation, which are similar to the above described analysis.

The above described method of the computer translation is called a pivot method in which the procedure follows the steps formulated by solid line arrows shown in FIG. 1 to obtain the intermediate language and then to finally obtaining the target language.

Another method is called a transfer method in which the procedure takes a short cut step formulated by one of chain line arrows to complete the translation without obtaining the intermediate language.

There have been proposed a number of translation apparatuses which can translate, through either the pivot method or transfer method, an original language, sentence by sentence, to a target language, and the translated result will be displayed on a screen.

A problem in the prior art translation apparatuses is that when the sentence of the original language contains one or more inserted marks such as colons, semicolons, quotation marks, or parentheses, the translation procedure becomes very difficult and complicated.

For example, when the original language sentence contains a colon or semicolon, the translation machine automatically and uniformly translates each inserted colon or semicolon to a most plausible translation in the target language. In some cases, the sentences with the colon or semicolon are translated correctly, but in other cases, the translated sentences are meaningless. In such a case, the operator manually provides proper translations or marks in the target language, thereby reducing the reliability of the translation system.

Another example is when the original language sentence contains parentheses. In this case, the operator usually deletes the parentheses together with the contents therein, so that the machine can translate the sentence without the parentheses and the contents therein. Then, the operator manually translates the contents within the parentheses and inserts the translated result in the machine translated sentence together with the parentheses. Therefore, it is very difficult to obtain a properly translated sentence having parentheses and the contents thereof inserted in the right place.

A further example is when the original language sentence contains quotation marks. In this case, each quotation mark is rendered as a word in the translation procedure. However, since the word order can change between the original and the target languages, the grammar for inserting the quotation marks can be very difficult.

SUMMARY OF THE INVENTION

The present invention has been developed to substantially solve the above described disadvantages and has for its essential objective to provide an improved translation system which can automatically translate the original language sentence into the the target language sentence even when the original language sentence contains one or more inserted marks.

In accomplishing these and other, objectives, a translation system for translating a sentence of an original language into a sentence of a target language includes a computer which has subroutines for pre-treating an insertion mark which is one of quotation mark, colon, semicolon or parenthesis used in the original language sentence, and subroutines for post-treating the insertion mark to provide an appropriate translation of the insertion mark into the target language sentence.

BRIEF DESCRIPTION OF THE DRAWINGS

These and other objectives and features of the present invention will become apparent from the following description taken in conjunction with a preferred embodiment thereof with reference to the accompanying drawings, throughout which like parts are designated by like reference numerals, and in which:

FIGS. 8a, 8b and 8c are diagrams showing the data to be stored in the buffer;

FIG. 14 is a diagrammatic view showing an example of an inputted sentence with quotation marks;

FIG. 15 is a diagram showing a tree structure data stored in the buffer;

FIGS. 16, 17 and 18 are schematic views showing the display of the translation results of the sentences containing quotation, marks;

FIG. 20 is a diagram showing the data to be stored in the buffer.

DETAILED DESCRIPTION OF THE PREFERRED EMBODIMENT

Figure 2:
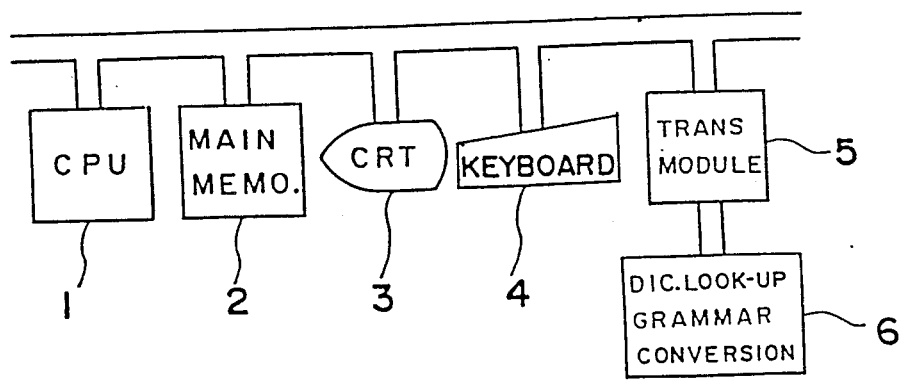
FIG. 2 is a block diagram of a translation apparatus according to a preferred embodiment of the present invention.

Referring to FIG. 2, a block diagram of a language translation apparatus according to a preferred embodiment of the present invention is shown, which performs translation from one language-(original language), such as English, to another language (target language), such as Japanese, using a computer. The translation apparatus comprises a central processing unit (CPU) 1 for carrying out the translation, a main memory 2 for storing programs to be used in CPU 1, a display 3 having a cathode-ray tube (CRT) for displaying the necessary information required for the translation, a keyboard 4 for inputting necessary information required for the translation process, a translation module 5 for storing such information or the like, and a table 6 for storing dictionary, grammar and conversion rules to be used during the conversion between tree structures. It is to be noted that an optical character reader (OCR) may be used as an input means for inputting the original sentences to be translated.

Figure 1:
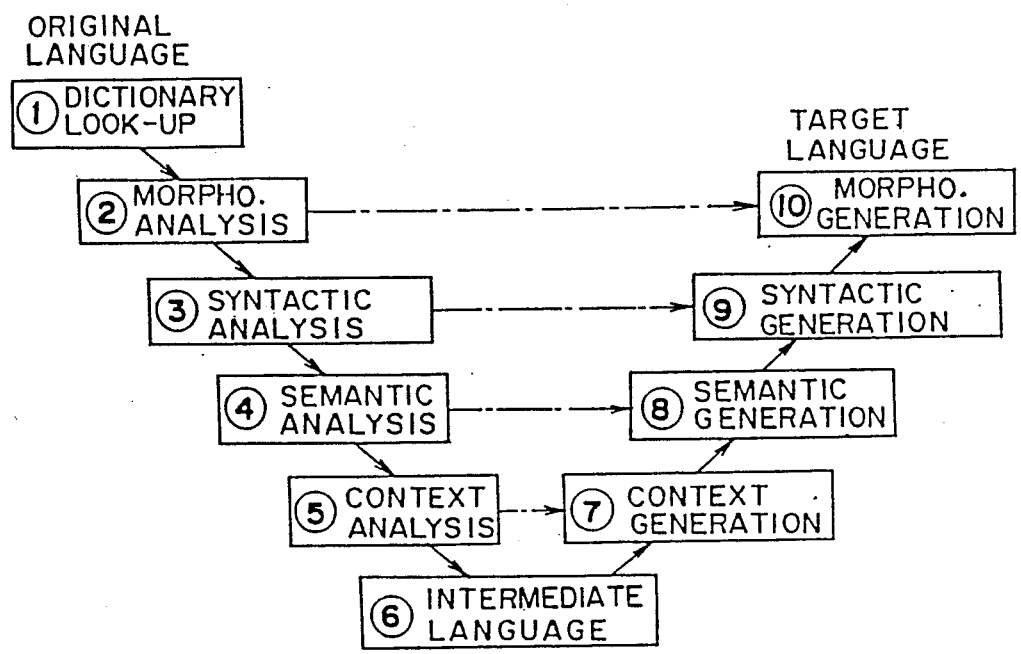
FIG. 1 is a diagrammatic view showing the processes for translating from one language to another language.

According to the embodiment disclosed herein, the translation is carried out using the transfer method, as explained above in connection with FIG. 1, with the analysis done as far as the syntactic analysis. However, it is possible to use the pivot method or the transfer method with the analysis done up to different levels.

Figure 3:
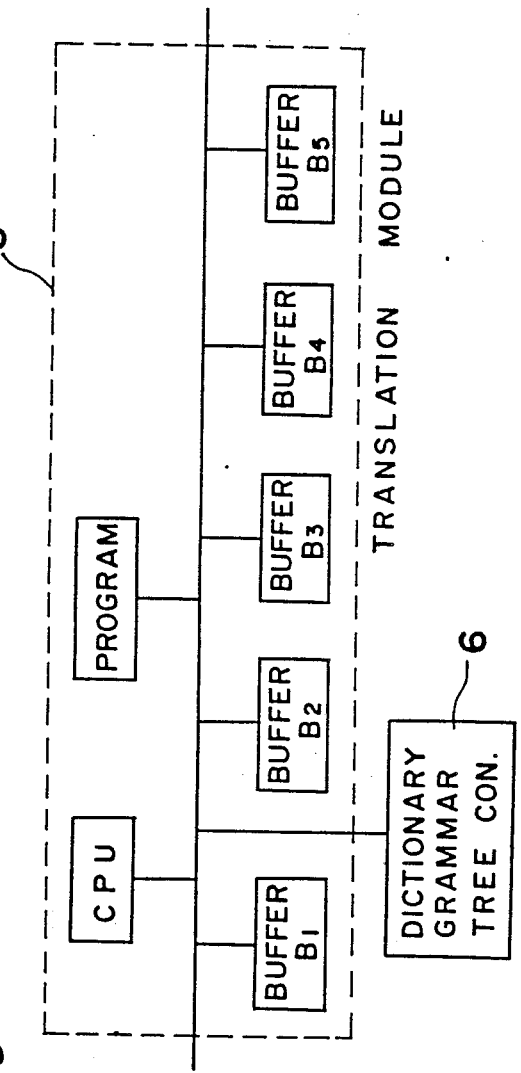
FIG. 3 is a block diagram showing a detail of the translation module shown in FIG. 2.

Referring to FIG. 3, a hardware structure of the translation module 5 is shown, which comprises five buffers B1, B2, B3, B4 and B5, a CPU and a program memory. The five buffers are provided for storing the analysis results of the different levels.

Figure 4:
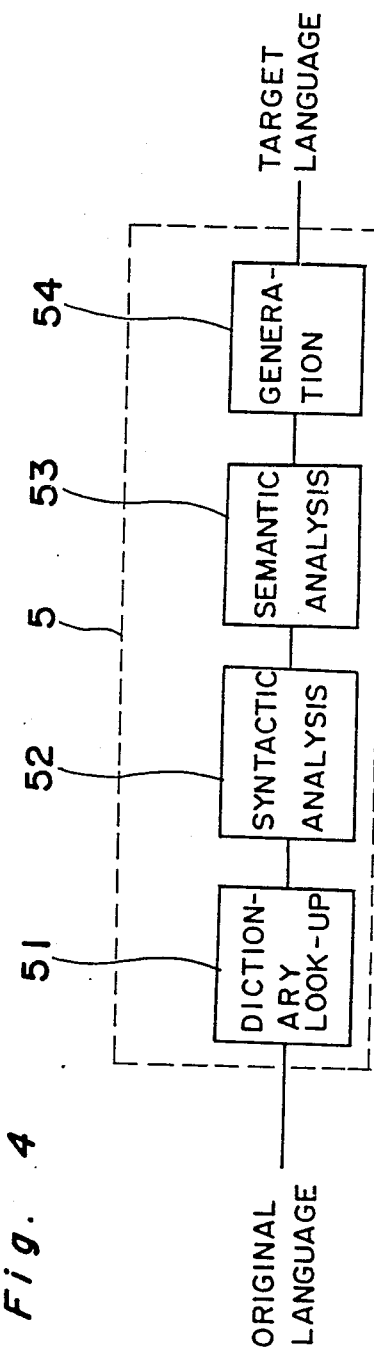
FIG. 4 is a block diagram showing the translation processes employed in the embodiment of the present invention.

Referring to FIG. 4, a flowchart of the translation module 5 is shown which comprises: a dictionary look-up process 51 for obtaining information for each word using a dictionary stored in the memory upon receipt of the original language (English) sentence; a syntactic analysis process 52 for analyzing the sentence in a tree structure; a semantic analysis process 53 for analyzing the meaning of the sentence; and a sentence generation process 54 for generating a sentence into the target language (Japanese).

Figures 5A, 5B, 5C:
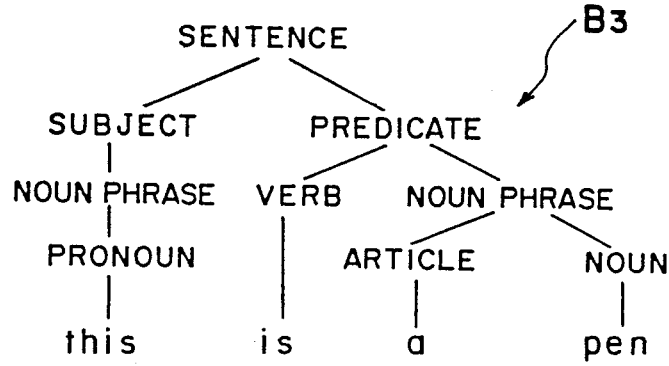
FIGS. 5a to 5e, are diagrammatic views showing the data to be stored in the buffers shown in FIG. 3.

It is now assumed that an English sentence "This is a pen" is inputted to the apparatus. Buffers B1 and B2 are used for the dictionary look-up process 51. In buffer B1, the sentence is separated into words and the words are sequentially stored in different areas, as shown in FIG. 5a. Then, in buffer B2, each original word is provided with various word information utilizing a dictionary and grammar text stored in the apparatus. An example of the data stored in buffer B2 is shown in FIG. 5b. Although the word "this" can be either an adjective, a pronoun, or an adverb, it is determined as a pronoun in the syntactic analysis process 52. Thus, buffer B3, which is used for process 52, stores the sentence in association with a tree construction analysis. To obtain the tree structure of FIG. 5c, an analysis shown in Table 2 below is carried out with the necessary information derived from table 6 (FIG. 3), which carries words and the translation and grammatical information.

TABLE 2

| UNIT | ELEMENTS DEFINING THE UNIT |
| --- | --- |
| Sentence | Subject and Predicate |
| Subject | Noun phrase |
| Predicate | Verb and Noun phrase |
| Noun phrase | Pronoun |
| Noun phrase | Article and Noun |

By the above table, each unit can be analyzed elements. For example, a sentence can be analyzed according to a subject and a predicate.

Figures 5D, 5E:
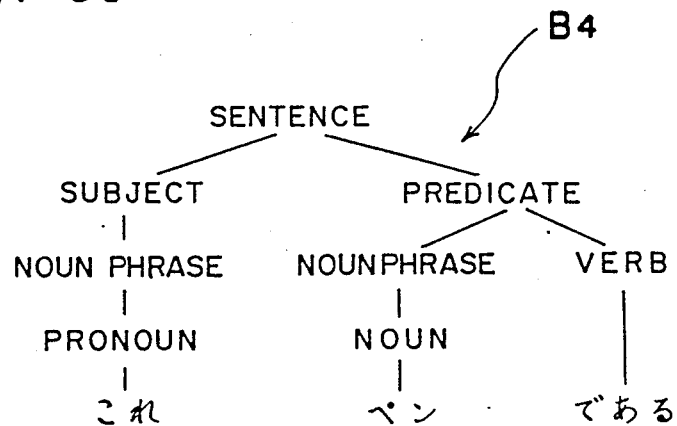

Then, in semantic analysis process 53, analysis is carried out in accordance with a conversion from the tree structure based on the English language to the tree structure based on the Japanese language to obtain a new tree structure, as shown in FIG. 5d, which is stored in buffer B4.

Thereafter, in the sentence generation process 54, postpositional words each functioning as an auxiliary to a main word, according to the Japanese grammar, are added to complete the translation into Japanese. The translation as completed is stored in buffer B5 as shown in FIG. 5e, and is outputted from translation module 5.

Figure 6:
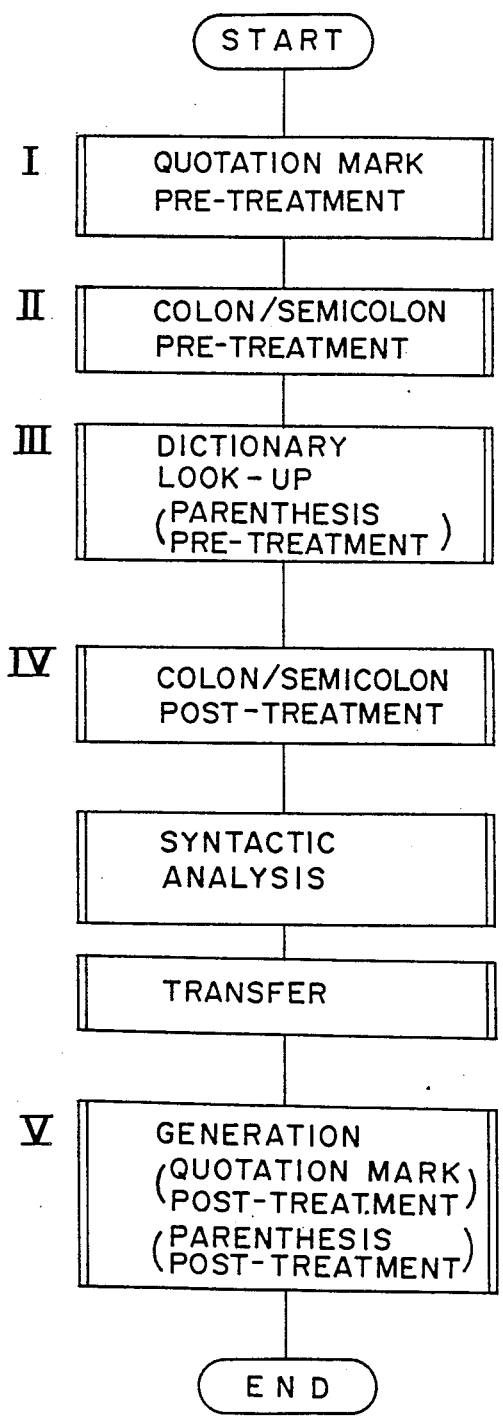
FIG. 6 is a main flow chart showing the operation of the language translation according to the present invention.

Referring to FIG. 6, the language translation system of the present invention is programmed to follow: a quotation mark pre-treatment subroutine I; a colon/-semicolon pre-treatment subroutine II; a dictionary look-up subroutine III; a colon/semicolon post-treatment subroutine IV; a syntactic analysis subroutine; a transfer subroutine; and a generation subroutine V, which are carried out in translation module 5.

The colons and semicolons are pre-treated and post-treated in subroutines II and IV, respectively, which will be described in detail in connection with FIGS. 7-10. The quotation marks are pre-treated and post-treated in subroutines I and V, respectively, which will be described in detail in connection with FIGS. 11-18. The parentheses are pre-treated and post-treated in subroutines III and V, respectively, which will be described in detail in connection with FIGS. 19, 13 and 20.

Colons and Semicolons

Figure 7:
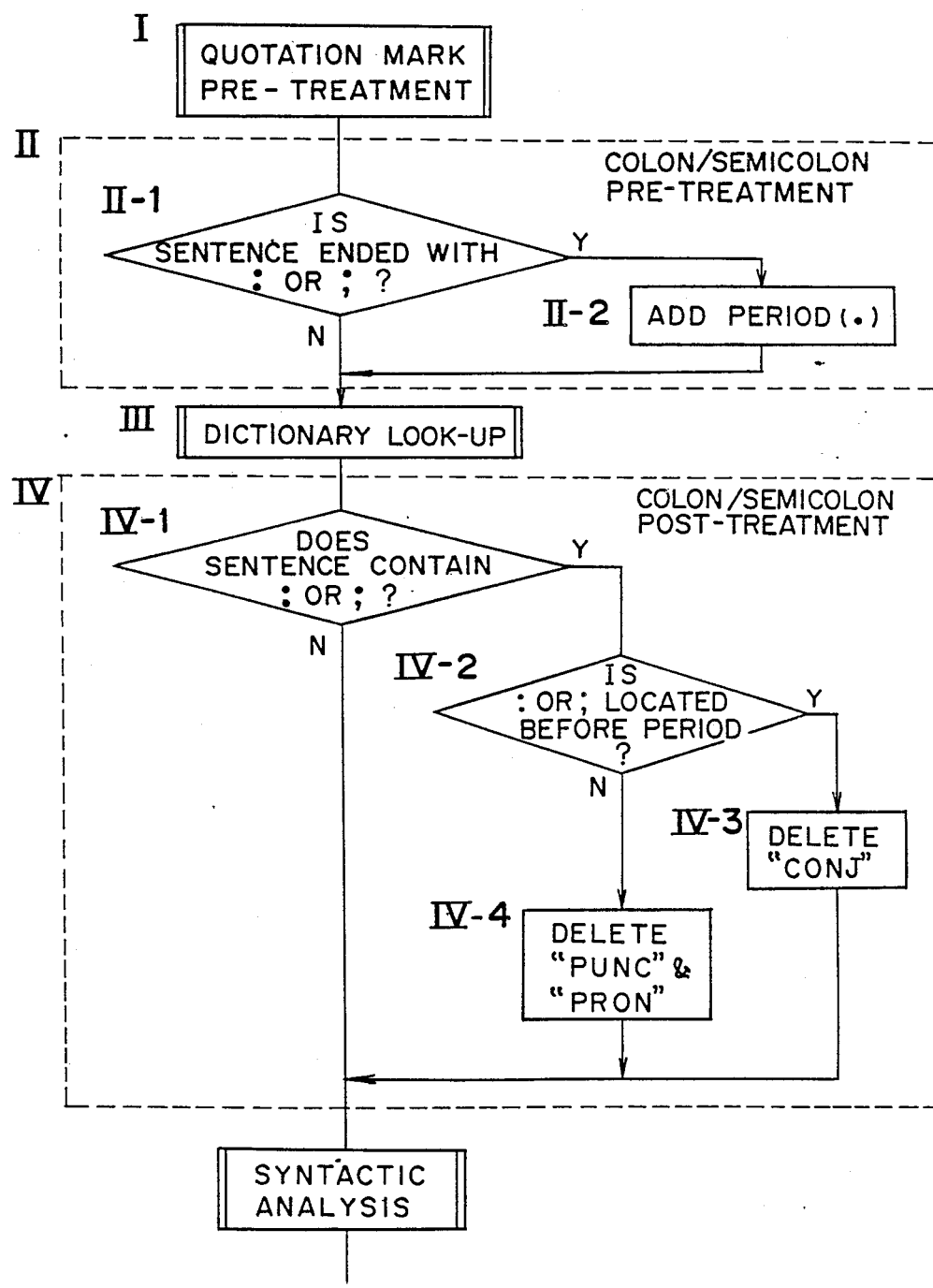
FIG. 7 is a flow chart showing the colon/semicolon pre-treatment subroutine and the colon/semicolon post-treatment subroutine shown in FIG. 6.

Referring to FIG. 7, a flow chart of subroutines II and IV for the colon and semicolon pre-treatment and post-treatment is shown. The colon and semicolon pre-treatment subroutine II includes a step II-1 at which it is detected whether or not the input sentence ends with a colon or semicolon. If the answer is YES, the program goes to step II-2 at which a period is added at the end of the sentence. If the answer is NO, the program goes to the dictionary look-up subroutine.

Three different examples are given below.
(A) This chapter explains;
(B) This chapter explains these;
(C) This chapter explains these; the next chapter explains those.

In the case where the sentence (A) or (B) is inputted, a period is added at the end of the sentence, such as shown below.
(A) This chapter explains;.

Then, in the dictionary look-up subroutine III, the words in the sentence (A) are analyzed and the result is stored in the buffer, such as shown in FIG. 8a. Similarly, the sentences (B) and (C) are analyzed and the results are stored in the buffer, such as shown in FIGS. 8b and 8c, respectively. As apparent from FIGS. 8a, 8b and 8c, the semicolon is identified as one word and is analyzed either as a punctuation mark, pronoun or conjunction. The same can be said of the colon.

The colon and semicolon post-treatment subroutine IV includes a step IV-1 at which it is detected whether or not the input sentence contains a colon or semicolon either within the body of the sentence or at the end of the sentence. In the cases of the above three examples, the result will be YES, so that the program goes to step IV-2, at which it is detected whether or not the colon or semicolon is located immediately before the period. If YES, such as in the case of examples (A) and (B), the program goes to step IV-3 at which the "conjunction" is deleted from the row defining the semicolon, as shown by parentheses in FIGS. 8a and 8b. Thus, the colon or semicolon inserted immediately before the period is defined as a punctuation mark or pronoun.

On the contrary, if the answer is NO, meaning that the colon or semicolon is located intermediately within the body of the sentence, such as in the case of example (C), the program goes to step IV-4 at which the "punctuation" and "pronoun" are deleted from the row defining the semicolon, as shown by parentheses in FIG. 8c. Thus, the colon or semicolon provided within the body of the sentence is defined as a conjunction.

Figure 9A:
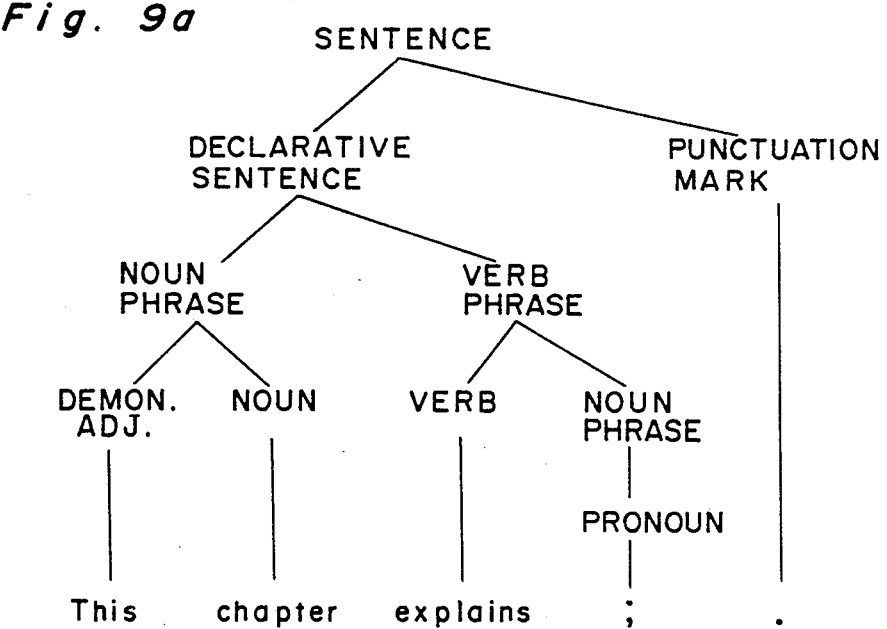
FIGS. 9a, 9b and 9c are diagrams showing the tree structure data stored in the buffer.
Figure 9B:
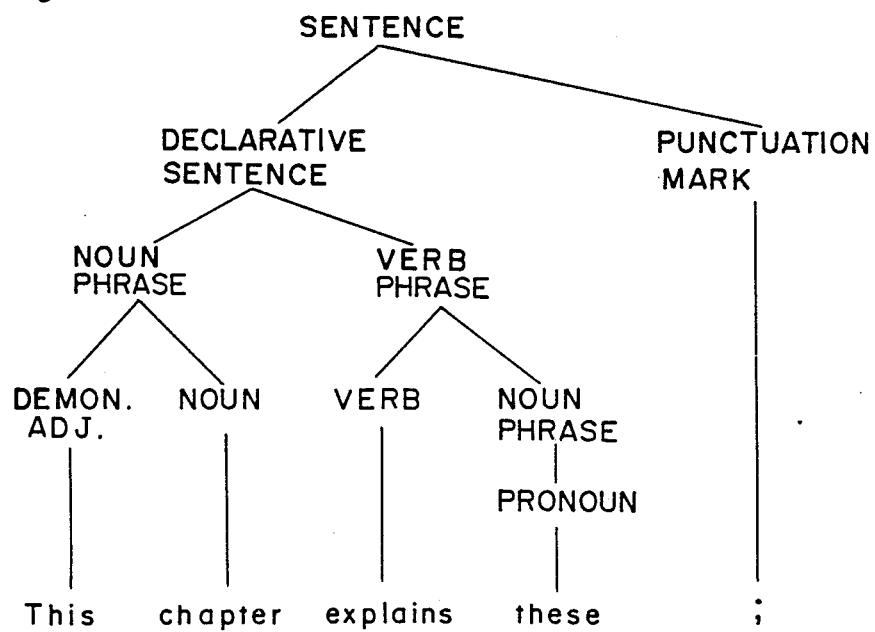
Figures 9C, 10:
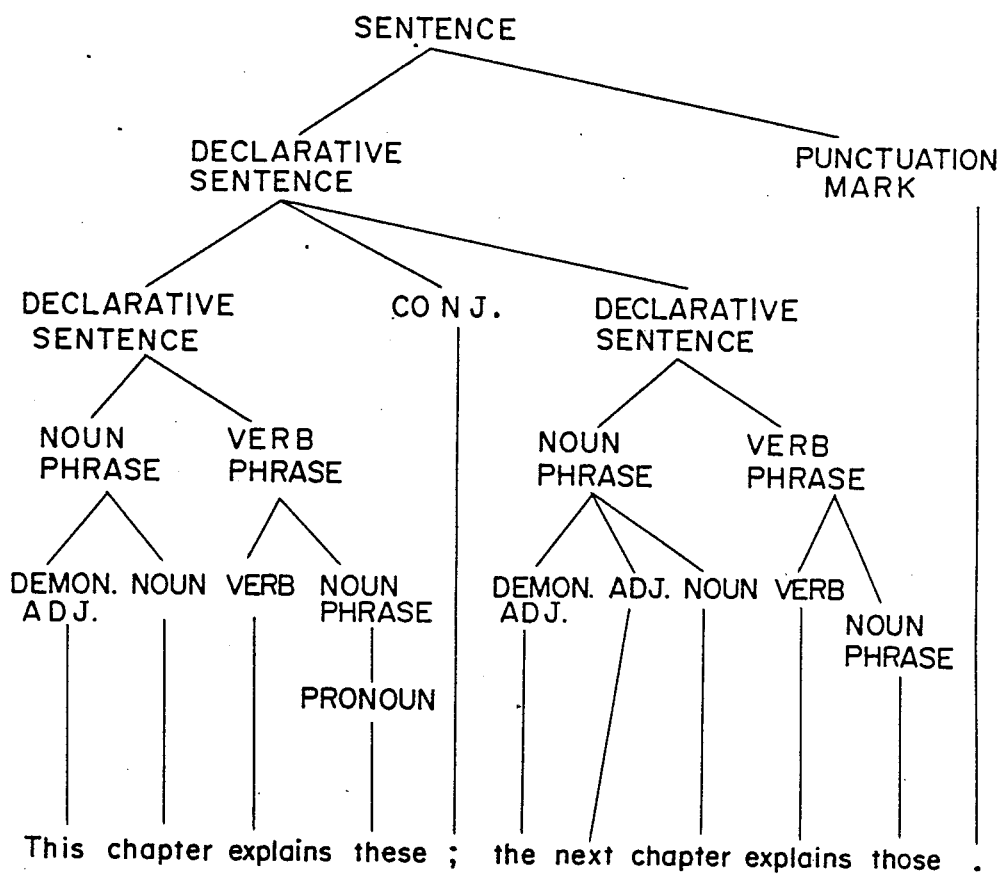
FIG. 10 is a schematic view showing the display of the translation results of the sentences containing a semicolon.

Then, in the subroutine for the syntactic analysis, a tree structure is obtained, such as shown in FIGS. 9a, 9b and 9c for the above given three examples, respectively. Under this embodiment, instead of Table 2, the analysis for obtaining the tree structure is carried out using a Table 2' as shown below.

TABLE 2

| UNIT | ELEMENTS DEFINING THE UNIT |
| --- | --- |
| Sentence | Declarative Sentence + Punctuation Mark |
| Declarative Sentence | Noun phrase + Verb phrase |
| Noun phrase | Pronoun |
| Noun phrase | Demonstrative Adjective + Noun |
| Noun phrase | Demonstrative Adjective + Adjective + Noun |
| Verb phrase | Verb + Noun phrase |
| Declarative | Declarative Sentence + conjunction + |

TABLE 2-continued

| UNIT | ELEMENTS DEFINING THE UNIT |
| --- | --- |
| Sentence | Declarative Sentence |

By the above table, each unit can be analyzed in elements. For example, a sentence can be analyzed according to a declarative sentence and a punctuation mark, as shown in FIGS. 9a, 9b and 9c.

In the case of example sentence (A), the semicolon is provided after a transitive verb "explain" which takes an object, as identified in the dictionary look-up subroutine, and, therefore, the semicolon is considered to be the object of the transitive verb "explain" and is finally analyzed as a pronoun, as shown in FIG. 9a. If it is so defined in the dictionary that the semicolon is used as a pronoun means, in Japanese, " " (read as "ika", meaning "follow"), the example sentence (A) will be translated into Japanese as shown in FIG. 10, row 1, reading a Japanese equivalent of "This chapter explains as follows."

In the case of example sentence (B), since the word "these" serves as the object of the transitive verb "explain", the semicolon is finally analyzed as a punctuation mark, i.e., a period. The period added at the end of this sentence at step II-2 will not appear in the tree structure, because it is not necessary to provide more than one period at the end of a sentence. Therefore, the added period will not be used in the translation. The example sentence (B) will be translated into Japanese as shown in FIG. 10, row 2, reading a Japanese equivalent of "This chapter explains these."

In the case of example sentence (C), the semicolon is finally analyzed as a conjunction. Thus, the example sentence (C) is analyzed as a compound sentence separated at the semicolon, and it will be translated into Japanese as shown in FIG. 10, row 3, in which the Japanese translation says 'This chapter explains these; the next chapter explains those.'

Quotation Marks

Figure 11:
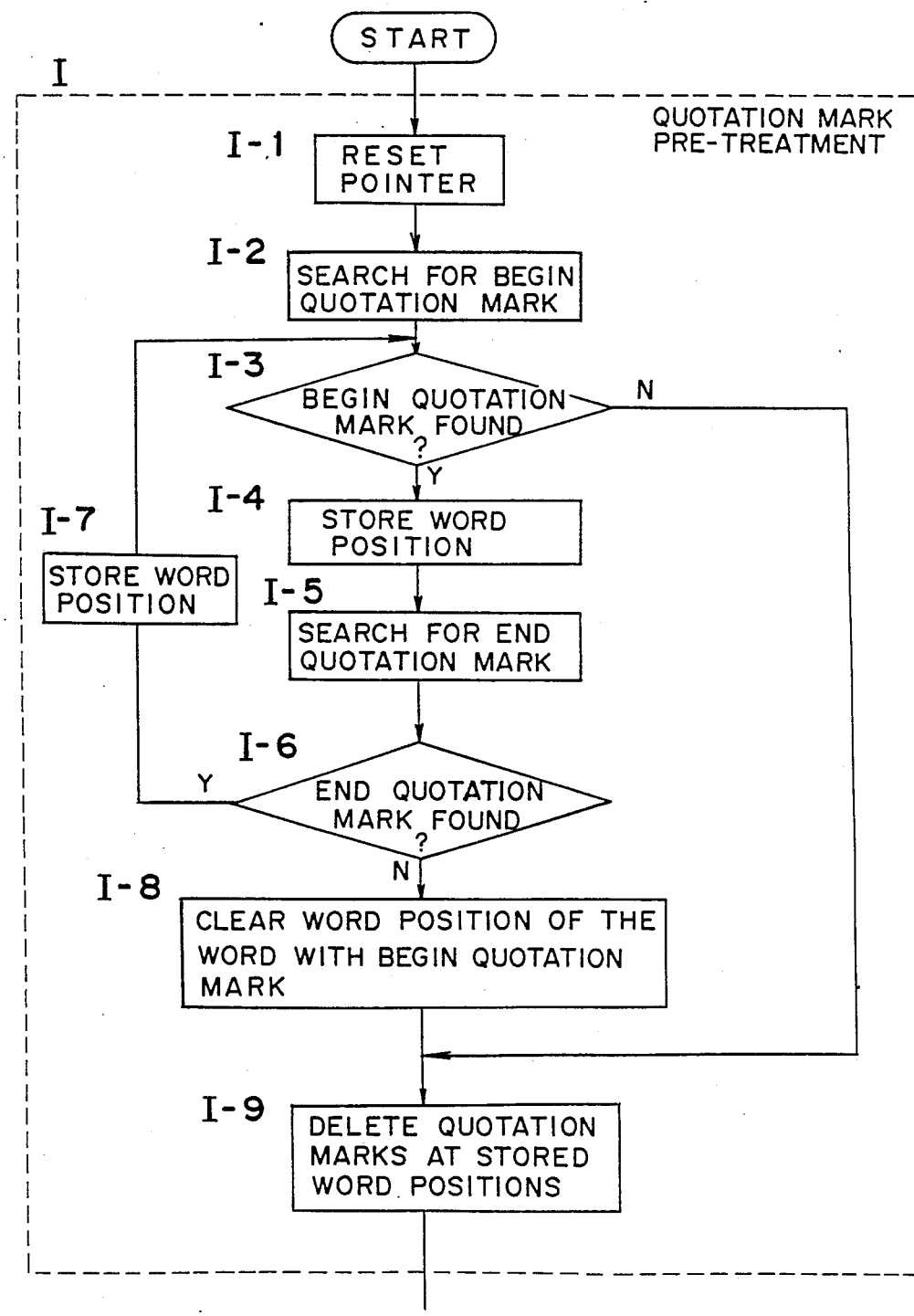
FIG. 11 is a flow chart showing the quotation mark pre-treatment subroutine shown in FIG. 6.

Referring to FIG. 11, a flow chart of the quotation mark pre-treatment subroutine I is shown. The quotation mark pre-treatment subroutine includes a step I-1 at which a pointer for pointing a word to be processed is reset to zero, so as to move the pointer to the first word. Then, at step I-2, a begin quotation mark (") is searched for and, at step I-3, it is detected whether or not the begin quotation mark is found. If YES, the program goes to step I-4 to store a word position of a word accompanying the detected begin quotation mark (") and a begin quotation mark itself. It is to be noted that the words of the input sentence are provided with word position numbers in series starting from zero, such as shown in FIG. 14. Then, at step I-5, an end quotation mark (") is searched for. When the end quotation mark is found, the program goes to step I-6 and further to step I-7 to store the word position of a word accompanying the detected end quotation mark (") and an end quotation mark itself. Thereafter, steps I-2 through I-7 are repeated to find all the quotation marks contained in the input sentence.

When a begin quotation mark is no longer found, the program goes from step I-3 to step I-9. Also, when an end quotation mark is no longer found, the program goes from step I-6 to step I-8 at which the stored word position of the word with begin quotation mark is cleared, and the program further goes to step I-9. Therefore, the word positions of the words provided with begin and end quotation marks are stored in pairs. At step I-9, the quotation marks at the stored word positions are deleted.

By the above program, a mark similar to or the same as the quotation mark, such as a mark representing the inches, will not be detected and thus, will not be deleted.

It is now assumed that the input sentence is: I bought a car "with 1000 dollars." In this case, each word is given a serial number starting from zero, as shown in FIG. 14 (step I-1). Then, at step I-4, the word position number "4" is stored together with the begin quotation mark. Thereafter, at step I-7, the word position number "6" is stored together with the quotation mark. Here, the reason for storing the word position number "6" instead of "7" is such that, in the case where the sentence ends with a period, the position of a word before the period is stored for expediency sake. Then, when the program goes to step I-3 for the second time, it jumps to step I-9 at which the quotation marks provided at the words corresponding to the stored word positions are deleted. Therefore, after the quotation mark pre-treatment subroutine I, such as in the dictionary look-up subroutine III and in the syntactic analysis subroutine, the sentence with no quotation mark is treated. Thus, no special grammar rule is needed to analyze the sentence.

Figure 12:
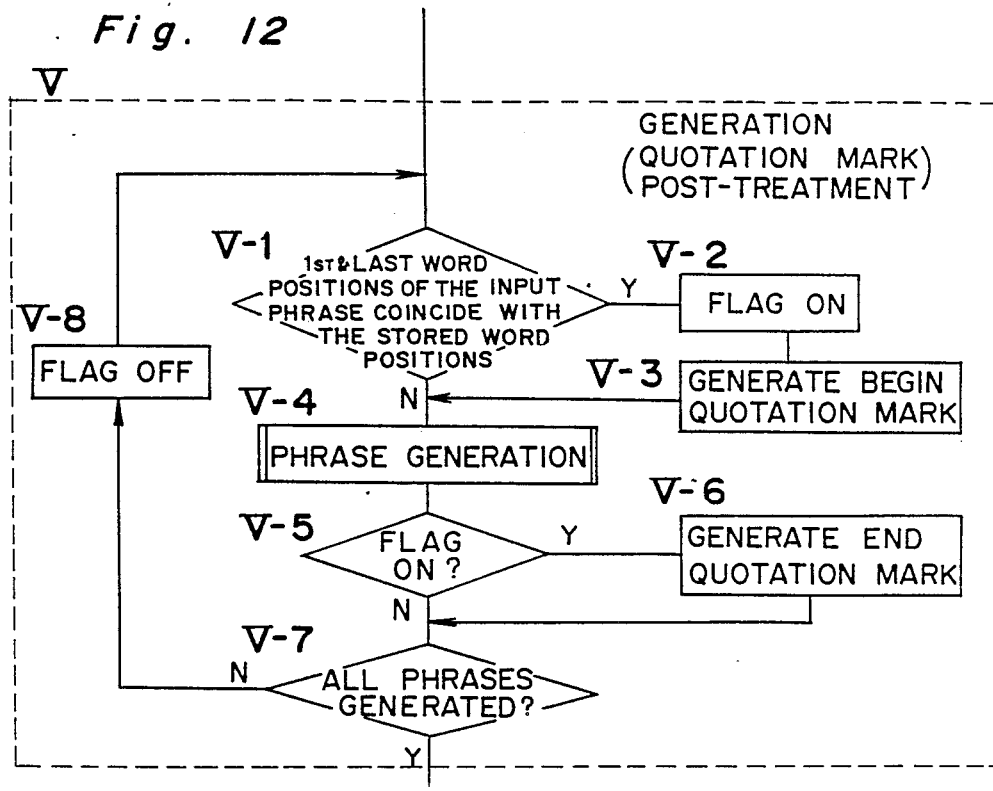
FIG. 12 is a flow chart showing the generation subroutine shown in FIG. 6.

Referring to FIG. 12, a flow chart of the quotation mark post-treatment subroutine V is shown. In the quotation mark post-treatment subroutine, the program operates with one unit of a phrase at a time and is applied in the order determined by the grammar rule. Thus, the phrases shown in the second analyzed level in FIG. 15 are applied and treated in the flow chart of FIG. 12 sequentially in the following order: first, the noun phrase "I" which has the first word position of "0" and the last word position of "0" is applied; second, the prepositional phrase "with 1000 dollars" which has the first word position of "4" and the last word position of "6" is applied; third, the noun phrase "a car" which has the first word position of "2" and the last word position of "3" is applied; fourth, the verb phrase "bought" which has the first word position of "1" and the last word position of "1" is applied; and fifth, the sentence end, which is the period, is applied.

At step V-1, the first and the last word positions of the applied phrase are compared with the stored word positions "4" and "6" as obtained in previous steps I-4 and I-7, respectively, and when they match each other, the program goes to step V-2 at which a flag is set. Then, at step V-3, a begin quotation mark in the target language (for example, in Japanese, the begin quotation mark is expressed by "「") is generated. Thereafter, at step V-4, the phrase detected at step V-1, in this case the prepositional phrase, is generated into Japanese. Then, at step V-5, since the flag is now set, the program goes to step V-6 at which an end quotation mark in the target language (for example, in Japanese, the end quotation mark is expressed by "」") is generated. Then, it is detected at step V-7 whether or not all the phrases are generated. If not, the program goes to step V-8 at which the flag is reset and repeats steps V-1 through V-7 to generate another phrase. When all the phrases are generated, the program completes the translation of the input sentence. The translated result will be displayed, such as in a manner shown in FIG. 16. FIGS. 17 and 18 show other examples of the translated results.

Parentheses

Figure 19:
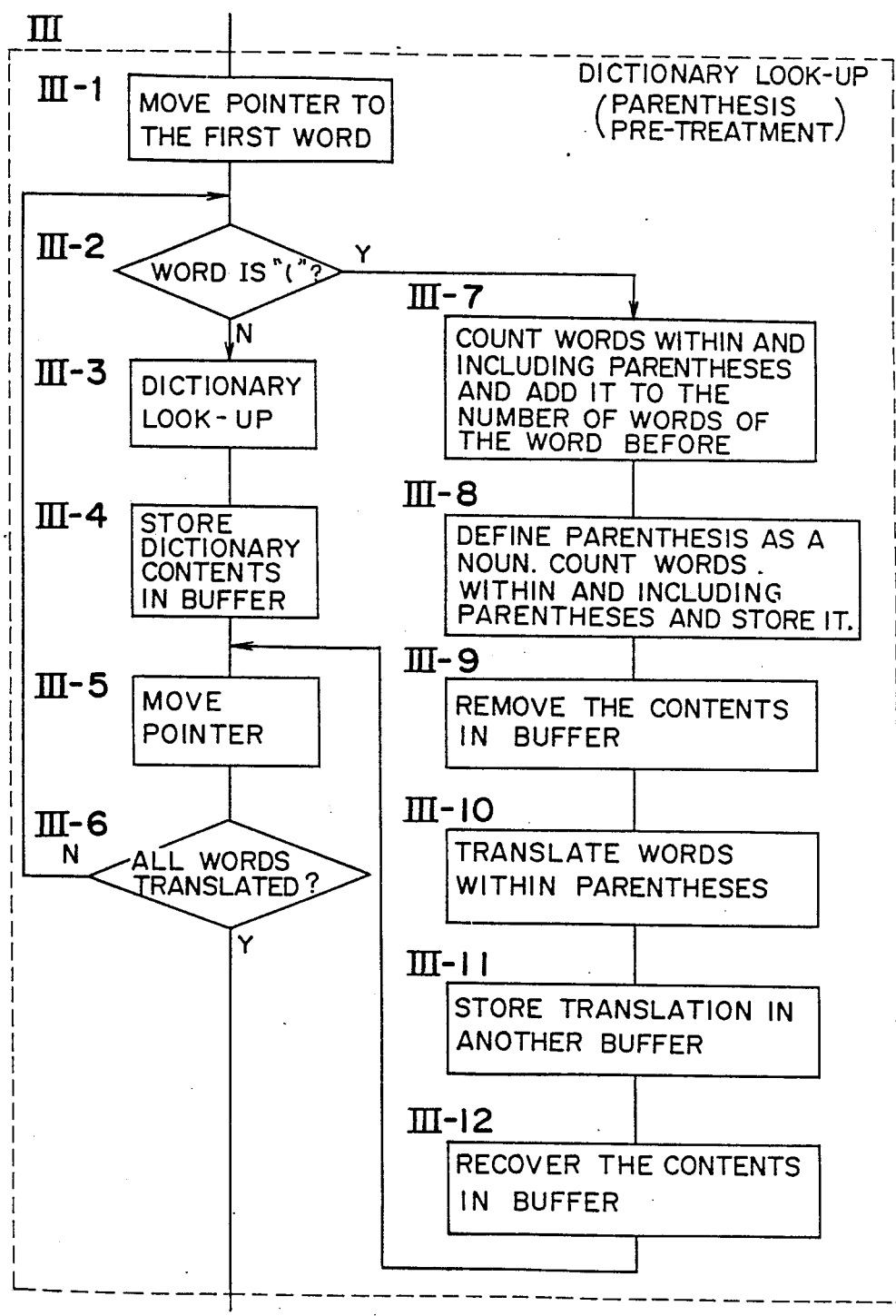
FIG. 19 is a flow chart showing the dictionary look-up subroutine shown in FIG. 6.

Referring to FIG. 19, a flow chart of the dictionary look-up subroutine III, which includes the parentheses pre-treatment, is shown. The dictionary look-up subroutine III includes a step III-1 at which a pointer for pointing out a word to be processed is reset to zero, so as to move the pointer to the first word. Then, at step III-2, it is detected whether or not the word is a begin parenthesis [(]. If it is not the begin parenthesis, the program goes to step III-3 at which the word is looked up in the dictionary to find its translation and other information such as its grammatical definition. The obtained information is stored in a buffer. Then, at step III-5, the pointer is moved to the next word and, at step III-6, it is detected whether or not all the words are translated. If not, the program returns to step III-2.

At step III-2, if it is detected that the word is the begin parenthesis, the program goes to step III-7 at which the number of words within and including the begin and end parentheses is counted. For example, if the input sentence is: I have a pen (I bought it yesterday)., the number of words within and including the begin and end parentheses is "6", as indicated in FIG. 20. The counted result is added to the number of words for the word just before the begin parenthesis. Therefore, the contents in the parentheses together- with the parentheses are defined as belongings of a word immediately before the begin parenthesis. Thus, according to the above example, the counted result "6" is added to the word number "1" of the word "pen" just before the begin parenthesis and the sum "7" is stored for the word number of the word "pen", as shown in FIG. 20. Thus, in the later subroutines, such as in the syntactic analysis subroutine, the word "pen" is treated as a single noun consisting of seven words. Then, at step III-8, the number of words within and including the begin and end parentheses is counted and is stored. Thus, in the example, the word number "6" is stored for the word number of the word "(". Thereafter, at step III-9, the contents of one buffer are temporarily removed and cleared for use in translating the words within the parentheses, as carried out in step III-10. The translated result is stored in another buffer (step III-11), and the temporarily removed data is returned back to the original buffer. Thereafter, at step III-5, the pointer is moved to the word next to the end parenthesis.

In this manner, the words within the parentheses are previously translated. If it is not necessary to translate the words in the parentheses, steps III-9 through III-12 may be skipped.

Figure 13:
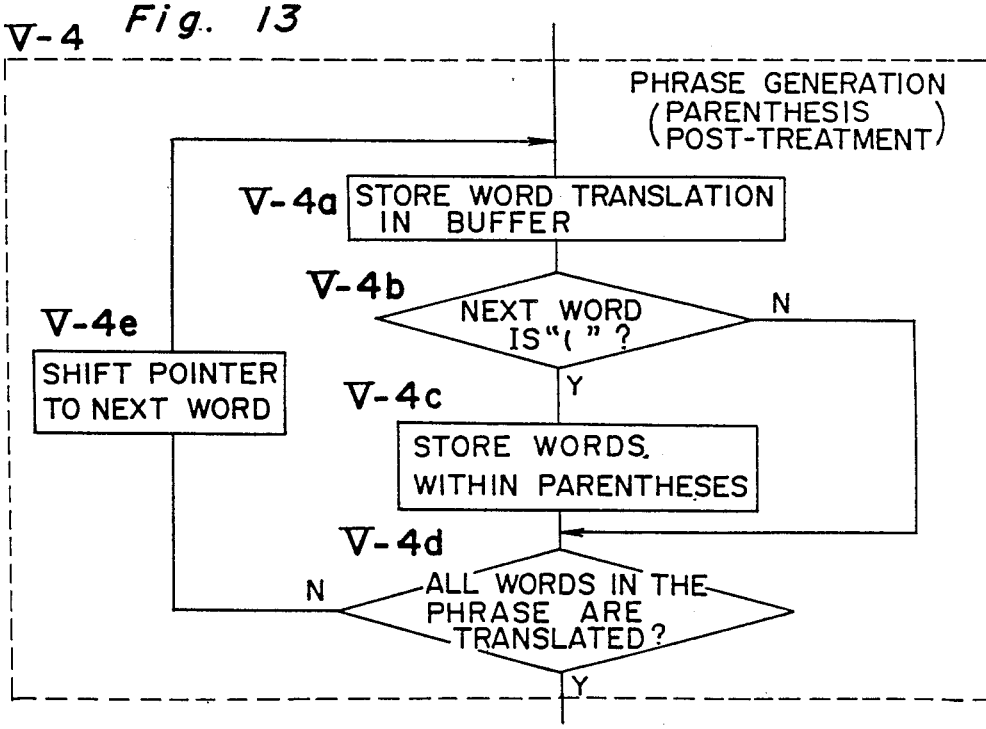
FIG. 13 is a flow chart showing the phrase generation subroutine shown in FIG. 12.

Referring to FIG. 13, a detail flow chart of the phrase generation step V-4 contained in FIG. 12 is shown. In this phrase generation subroutine V-4, the steps of the parentheses post-treatment are included.

At step V-4a, the translation of each word in the phrase is stored in a buffer. Then, at step V-4b, it is detected whether or not the next word is the begin parenthesis [(]. If YES, the program goes to step V-4c at which the words within and including the parentheses, which are already translated in the target language, are stored in the translation buffer. Then, at step V-4d, it is detected whether or not all the words in the phrase are translated. If not, the program goes to step V-4e to shift the pointer to the next word. In the case where the pointer is pointing the begin parenthesis [(], the next word which will be pointed by the pointer in step V-4e will be the word after the end parenthesis [)]. This can be accomplished by increasing the counter of the pointer by the amount of the word number stored for the begin parenthesis, such as shown in FIG. 20.

As has been fully described above, according to the present invention, since the input sentence which contains inserted marks, such as colons, semicolons, quotation marks, or parentheses, etc., can be translated automatically without employing any sophisticated grammar or program, the translation can be done quickly and with less errors.

The embodiment herein described is designed to carry out the translation under the transfer method with the analysis done as far as the syntactic analysis. However, the program may also be so designed as to carry out the translation under the pivot method or the transfer method with the analysis done up to different levels.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A translation system for translating a sentence of an original language into a sentence of a target language comprising:

first detecting means for detecting either a colon or semicolon within the original language sentence;

second detecting means for detecting a position of the detected colon or semicolon in the original language sentence, said position being either at an end of the original language sentence or within the body of the original language sentence; and syntactic analysis mans for defining the detected colon or semicolon located at the end of the original language sentence as a punctuation mark or a pronoun and for defining the detected colon or semicolon located within the body of the original language sentence as a conjunction.

2. A translation system for translating a sentence of an original language into a sentence of a target language comprising:

first detecting means for detecting if a colon or semicolon is positioned at an end of the original language sentence;

adding means, in response to said first detecting means, for adding a period after said colon or semicolon when said first detecting means detects said position of said colon or semicolon is at the end of the original language sentence to form a modified original language sentence;

second detecting means for detecting if a colon or semicolon is positioned within the body of the original language sentence;

third detecting means for detecting if the detected colon or semicolon is located immediately before the added period of said modified original language sentence or if the detected colon or semicolon is located intermediately within the body of the original language sentence; and syntactic analysis means for defining said colon or semicolon located immediately before the added period as a punctuation mark when the original language sentence has a transitive verb and an object;

said syntactic analysis means defining said colon or semicolon located immediately before the added period of said modified original language sentence as a pronoun when the original language sentence has a transitive verb but no object;

said syntactic analysis means defining said colon or semicolon located intermediately within the body of the original language sentence as a conjunction.

3. A translation system for translating a sentence of an original language into a sentence of a target language comprising:

numbering means for providing a serial number position to each word in the sentence of the original language;

detecting means for detecting a pair of quotation marks within the original language sentence;

storing means for storing said serial number positions of the detected quotation marks;

deleting means for deleting the detected quotation marks from the original language sentence to create a modified original language sentence;

translation means for translating said modified original language sentence into the target language sentence; and adding means for adding quotation marks into the translated target language sentence at positions corresponding to the stored serial number positions.

4. A translation system for translating a sentence of an original language into a sentence of a target language comprising:

detecting means for detecting a begin parenthesis and an end parenthesis in the original language sentence; and grouping means for grouping contents within the parentheses together with the parentheses and for designating the grouped contents as a single word to be combined with a word immediately positioned before said begin parenthesis.

5. The translation system as claimed in claim 4, further comprising:

translating means for translating the contents in the parentheses into the target language.

6. A method for translating punctuation marks of an original language into a target language utilizing a translation apparatus comprising the steps of:

(a) detecting a position of a semicolon or colon in a sentence of the original language;

(b) analyzing the position of the semicolon or colon detected in said step (a);

(c) defining the semicolon or colon as a punctuation mark when the position of the semicolon or colon is detected to be at an end of the sentence of the original language in said step (a) and the sentence of the original language has a transitive verb and an object;

(d) defining the semicolon or colon as a pronoun when the position of the semicolon or colon is detected to be at an end of the sentence of the original language in said step (a) and the sentence of the original language has a transitive verb but no object; and (e) defining the semicolon or colon as a conjunction when the position of the semicolon or colon is detected to be intermediately within the sentence of the original language.

7. The method as claimed in claim 6 further comprising the steps of:

(f) adding a period to the end of the sentence of the original language when the position of the semicolon or colon is detected to be at the end of the sentence of the original language in said step (a).

8. A method for translating punctuation marks of an original language into a target language comprising the steps of:
   (a) assigning a serial number position to each word in a sentence of the original language;
   (b) detecting a pair of quotation marks within the sentence of the original language;
   (c) storing the serial number positions corresponding the quotation marks detected in said step (b);
   (d) deleting the detected quotation marks from the sentence of the original language to create a modified sentence;
   (e) translating the modified sentence of said step (d); and
   (f) adding quotation marks into the translated sentence of said step (e) at positions corresponding to the stored serial number positions.

9. A method for translating punctuation marks of an original language into a target language comprising the steps of:
   (a) detecting a begin parenthesis and an end parenthesis in a sentence of the original language;
   (b) grouping contents within the parentheses together with the parentheses;
   (c) designating the grouped contents of said step (b) as a single word; and
   (d) combining the designated word of said step (c) with a word immediately positioned before the begin parenthesis.

10. The method as claimed in claim 9 further comprising the steps of:
    (e) separately translating the grouped contents of the parentheses into the target language.

* * * * *